(12) United States Patent
Yang et al.

(10) Patent No.: US 12,488,505 B2
(45) Date of Patent: Dec. 2, 2025

(54) POINT CLOUD ENCODING AND DECODING METHOD AND DEVICE BASED ON TWO-DIMENSIONAL REGULARIZATION PLANE PROJECTION

(71) Applicant: Honor Device Co., Ltd., Shenzhen (CN)

(72) Inventors: Fuzheng Yang, Shenzhen (CN); Wei Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 397 days.

(21) Appl. No.: 18/040,705

(22) PCT Filed: Feb. 7, 2022

(86) PCT No.: PCT/CN2022/075397
§ 371 (c)(1),
(2) Date: Feb. 6, 2023

(87) PCT Pub. No.: WO2022/166963
PCT Pub. Date: Aug. 11, 2022

(65) Prior Publication Data
US 2023/0290007 A1 Sep. 14, 2023

(30) Foreign Application Priority Data
Feb. 8, 2021 (CN) .......................... 202110172795.4

(51) Int. Cl.
*G06K 9/36* (2006.01)
*G06T 9/00* (2006.01)

(52) U.S. Cl.
CPC ..................................... *G06T 9/00* (2013.01)

(58) Field of Classification Search
CPC ......... G06T 15/00; G06T 17/00; G06T 19/00; G06T 2219/00; G06T 2215/00;
(Continued)

(56) References Cited

U.S. PATENT DOCUMENTS 11,368,719 B2   6/2022  Oh et al.
11,463,681 B2  10/2022  Aflaki Beni et al.
(Continued)

FOREIGN PATENT DOCUMENTS

WO   2019162567 A1   8/2019
WO   2020013631 A1   1/2020
(Continued)

OTHER PUBLICATIONS

L. He, W. Zhu and Y. Xu, "Best-effort projection based attribute compression for 3D point cloud," Dec. 2017 23rd Asia-Pacific Conference on Communications (APCC), Perth, WA, Australia, 2017, 6 pages.
(Continued)

*Primary Examiner* — Duy M Dang
(74) *Attorney, Agent, or Firm* — Slater Matsil, LLP (57) ABSTRACT

Disclosed are a point cloud encoding and decoding method and device based on a two-dimensional regularization plane projection. The encoding method includes: acquiring original point cloud data; performing two-dimensional regularization plane projection on the original point cloud data to obtain a two-dimensional projection plane structure; obtaining a plurality of pieces of two-dimensional image information according to the two-dimensional projection plane structure; and encoding the plurality of pieces of two-dimensional image information to obtain code stream information.

15 Claims, 6 Drawing Sheets

(58) Field of Classification Search
CPC . G06T 9/00; G06T 9/004; G06T 2207/10028; H04N 19/597; H04N 19/43; H04N 9/3179; H04N 19/124; H04N 19/129; H04N 19/136; H04N 19/159; H04N 19/182; H04N 19/46
See application file for complete search history.

(56) References Cited

U.S. PATENT DOCUMENTS

| | | |
|---|---|---|
| 2019/0311500 A1 | 10/2019 | Mammou et al. |
| 2020/0296401 A1 | 9/2020 | Lee et al. |
| 2022/0084254 A1 | 3/2022 | Oh et al. |

FOREIGN PATENT DOCUMENTS

| | | |
|---|---|---|
| WO | 2020145783 A1 | 7/2020 |
| WO | 2020187140 A1 | 9/2020 |

OTHER PUBLICATIONS

V. Fakour Sevom, S. Schwarz and M. Gabbouj, "Geometry-Guided 3D Data Interpolation for Projection-Based Dynamic Point Cloud Coding," 2018 7th European Workshop on Visual Information Processing (EUVIP), Tampere, Finland, Nov. 2018, 6 pages.

E. Lopes, J. Ascenso, C. Brites and F. Pereira, "Adaptive Plane Projection for Video-Based Point Cloud Coding," 2019 IEEE International Conference on Multimedia and Expo (ICME), Shanghai, China, Jul. 2019, 6 pages.

H. Roodak and M. N. Bojnordi, "Compressed Geometric Arrays for Point Cloud Processing," in IEEE Transactions on Multimedia, vol. 25, Dec. 2022, 17 pages.

POINT CLOUD ENCODING AND DECODING METHOD AND DEVICE BASED ON TWO-DIMENSIONAL REGULARIZATION PLANE PROJECTION

CROSS-REFERENCE TO RELATED APPLICATIONS

This application is a national stage of International Application No. PCT/CN2022/075397, filed on Feb. 7, 2022, which claims priority to Chinese Patent Application No. 202110172795.4, filed on Feb. 8, 2021. The disclosures of both of the aforementioned applications are hereby incorporated by reference in their entireties.

TECHNICAL FIELD

The present invention relates to technical field of encoding and decoding, and specifically, to a point cloud encoding and decoding method and device based on a two-dimensional regularization plane projection.

BACKGROUND

With the improvement of hardware processing capabilities and the rapid development of computer vision, the three-dimensional point cloud has become a new generation of immersive multimedia after audio, image, and video, and is widely applied to virtual reality, augmented reality, automated driving, environmental modeling, and the like. However, the three-dimensional point cloud usually has a relatively large amount of data, which is not conducive to the transmission and storage of point cloud data. Therefore, it is of great significance to study an efficient point cloud encoding and decoding technology.

In the existing geometry-based point cloud compression (G-PCC, Geometry-based Point Cloud Compression) encoding framework, the geometry information and attribute information of the point cloud are encoded separately. At present, the G-PCC geometric encoding and decoding may be divided into octree-based geometric encoding and decoding and prediction tree-based geometric encoding and decoding.

Octree-based geometric encoding and decoding: At an encoder side, firstly, the geometry information of the point cloud is preprocessed, which includes the coordinate conversion and voxelization process of the point cloud. Subsequently, tree division (octree/quadtree/binary tree) is continuously performed on a bounding box in which the point cloud is located in the order of breadth-first traversal. Finally, the placeholder code of each node is encoded, and the quantity of points included in each leaf node is encoded, to generate a binary code stream. At a decoder side, firstly, the placeholder code of each node is continuously obtained by parsing in the order of breadth-first traversal. Subsequently, tree division is continuously performed in sequence, and the division stops until a unit cube of 1×1×1 is obtained through division. Finally, the quantity of points included in each leaf node is obtained by parsing, and finally reconstructed point cloud geometry information is obtained.

Prediction tree-based geometric encoding and decoding: At the encoder side, firstly, an original point cloud is sorted. Subsequently, a prediction tree structure is established. By classifying each point to a laser scanner to which the point belongs, the prediction tree structure is established according to different laser scanners. Subsequently, each node in the prediction tree is traversed, geometry information of the nodes is predicted by selecting different prediction modes to obtain predicted residuals, the predicted residuals are quantized by using a quantization parameter. Finally, the prediction tree structure, the quantization parameter, the predicted residuals of the geometry information of the nodes, and the like are encoded to generate a binary code stream. At the decoder side, firstly, the code stream is analyzed; then the prediction tree structure is reconstructed; subsequently the predicted residuals are dequantized based on the predicted residual of the geometry information of each node obtained by parsing and the quantization parameter; and finally reconstructed geometry information of each node is restored. That is, reconstruction of point cloud geometry information is completed.

However, due to relatively strong spatial sparsity of the point cloud, for the point cloud encoding technology using an octree structure, this structure will lead to a relatively large proportion of empty nodes obtained by division, and the spatial correlation of the point cloud cannot be fully reflected, which is not conducive to point cloud prediction and entropy encoding. In the prediction tree-based point cloud encoding and decoding technology, some parameters of the lidar device are used to establish a tree structure, and the tree structure is used for predictive encoding based on this. However, the tree structure does not fully reflect the spatial correlation of the point cloud, which is not conducive to point cloud prediction and entropy encoding. Therefore, both of the foregoing two point cloud encoding and decoding technologies have the problem of insufficiently high encoding efficiency.

SUMMARY

To resolve the foregoing problem in the existing technologies, the present invention provides a point cloud encoding and decoding method and device based on a two-dimensional regularization plane projection. The technical problem to be resolved in the present invention is implemented by the following technical solutions:

A point cloud encoding method based on a two-dimensional regularization plane projection is provided, including:
    acquiring original point cloud data;
    performing two-dimensional regularization plane projection on the original point cloud data to obtain a two-dimensional projection plane structure;
    obtaining a plurality of pieces of two-dimensional image information according to the two-dimensional projection plane structure; and
    encoding the plurality of pieces of two-dimensional image information to obtain code stream information.

In an embodiment of the present invention, the performing two-dimensional regularization plane projection on the original point cloud data to obtain a two-dimensional projection plane structure includes:
    initializing the two-dimensional projection plane structure; and
    determining a mapping relationship between the original point cloud data and the two-dimensional projection plane structure, to project the original point cloud data onto the two-dimensional projection plane structure.

In an embodiment of the present invention, the plurality of pieces of two-dimensional image information include a geometry information map, the geometry information map including a placeholder information map, a depth information map, a projection residual information map, and a coordinate conversion error information map.

In an embodiment of the present invention, the encoding the plurality of pieces of two-dimensional image information to obtain code stream information includes:

encoding the placeholder information map, the depth information map, the projection residual information map, and the coordinate conversion error information map, to obtain a placeholder information code stream, a depth information code stream, a projection residual information code stream, and a coordinate conversion error information code stream respectively; and obtaining a geometry information code stream according to the placeholder information code stream, the depth information code stream, the projection residual information code stream, and the coordinate conversion error information code stream.

In an embodiment of the present invention, after the geometry information code stream is obtained, the method further includes:

performing geometry reconstruction according to the geometry information code stream to obtain reconstructed point cloud geometry information; and encoding attribute information of the original point cloud data based on the reconstructed point cloud geometry information to obtain an attribute information code stream.

In an embodiment of the present invention, the plurality of pieces of two-dimensional image information further include an attribute information map.

In an embodiment of the present invention, the encoding the plurality of pieces of two-dimensional image information to obtain code stream information further includes:

encoding the attribute information map to obtain an attribute information code stream.

Another embodiment of the present invention further provides a point cloud encoding device based on a two-dimensional regularization plane projection, including:

a first data acquisition module, configured to acquire original point cloud data;

a projection module, configured to perform two-dimensional regularization plane projection on the original point cloud data to obtain a two-dimensional projection plane structure;

a data processing module, configured to obtain a plurality of pieces of two-dimensional image information according to the two-dimensional projection plane structure; and an encoding module, configured to encode the plurality of pieces of two-dimensional image information to obtain code stream information.

Still another embodiment of the present invention further provides a point cloud decoding method based on a two-dimensional regularization plane projection, including:

acquiring code stream information and decoding the code stream information to obtain parsed data;

reconstructing a plurality of pieces of two-dimensional image information according to the parsed data;

obtaining a two-dimensional projection plane structure according to the plurality of pieces of two-dimensional image information; and reconstructing a point cloud by using the two-dimensional projection plane structure.

Still another embodiment of the present invention further provides a point cloud decoding device based on a two-dimensional regularization plane projection, including:

a second data acquisition module, configured to acquire code stream information and decode the code stream information to obtain parsed data;

a first reconstruction module, configured to reconstruct a plurality of pieces of two-dimensional image information according to the parsed data;

a second reconstruction module, configured to obtain a two-dimensional projection plane structure according to the plurality of pieces of two-dimensional image information; and a point cloud reconstruction module, configured to reconstruct a point cloud by using the two-dimensional projection plane structure.

Beneficial effects of the present invention are as follows:

According to the present invention, a point cloud in a three-dimensional space is projected to a corresponding two-dimensional regularization projection plane structure, and regularization correction is performed on the point cloud in a vertical direction and a horizontal direction, to obtain a strong correlation representation of the point cloud on the two-dimensional projection plane structure, so that sparsity in a three-dimensional representation structure is avoided, and the spatial correlation of the point cloud is better reflected; and when a plurality of pieces of two-dimensional image information obtained for the two-dimensional regularization projection plane structure are encoded subsequently, the spatial correlation of the point cloud can be greatly utilized, and the spatial redundancy is reduced, thereby further improving the encoding efficiency of the point cloud.

The following further describes the present invention in detail with reference to the accompanying drawings and the embodiments.

DETAILED DESCRIPTION OF ILLUSTRATIVE EMBODIMENTS

The present invention is further described in detail below with reference to specific embodiments, but the implementations of the present invention are not limited thereto.

Embodiment 1

Figure 1:
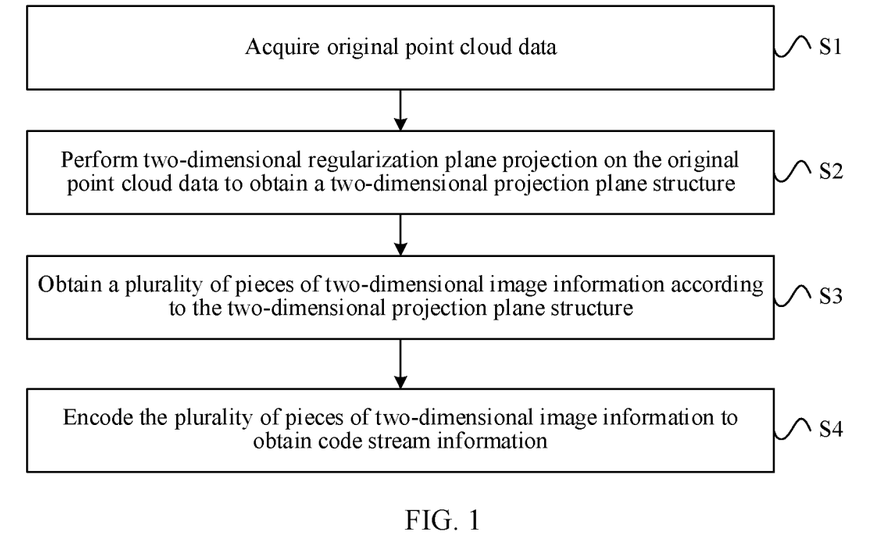
FIG. 1 is a schematic diagram of a point cloud encoding method based on a two-dimensional regularization plane projection according to an embodiment of the present invention.

FIG. 1 is a schematic diagram of a point cloud encoding method based on a two-dimensional regularization plane projection according to an embodiment of the present invention, which includes the following steps:

S1: Acquire Original Point Cloud Data.

Specifically, the original point cloud data usually includes a group of three-dimensional space points, and each space point records its geometric position information and additional attribute information such as color, reflectivity, and normal. The geometric position information of the point cloud is generally expressed based on a Cartesian coordinate system, that is, expressed by using the coordinates x, y, and z of points. The original point cloud data may be acquired through 3D scanning devices such as a lidar, and may alternatively be acquired based on public datasets provided by various platforms. In this embodiment, it is assumed that the geometric position information of the acquired original point cloud data is expressed based on the Cartesian coordinate system. It should be noted that the representation method of the geometric position information of the original point cloud data is not limited to Cartesian coordinates.

S2: Perform Two-Dimensional Regularization Plane Projection on the Original Point Cloud Data to Obtain a Two-Dimensional Projection Plane Structure.

Specifically, in this embodiment, before two-dimensional regularization plane projection is performed on the original point cloud, preprocessing such as voxelization processing may further be performed on the original point cloud data, to facilitate subsequent encoding.

First, the two-dimensional projection plane structure is initialized.

Initialization of the two-dimensional regularization projection plane structure of the point cloud requires the use of regularization parameters. The regularization parameters are usually finely measured by the manufacturer and provided to consumers as one of the necessary data, such as an acquisition range of a lidar, a sampling angular resolution $\Delta\varphi$ or the quantity of sampling points of the horizontal azimuth angle, a distance correction factor of each laser scanner, offset information $V_o$ and $H_o$ of the laser scanner in the vertical direction and the horizontal direction, and offset information $\theta_0$ and $\alpha$ of the laser scanner along the pitch angle and the horizontal azimuth angle.

It should be noted that the regularization parameters are not limited to the parameters given above. Given calibration parameters of the lidar may be used as the regularization parameters, or the regularization parameters may be obtained in manners such as optimizing estimation and data fitting in a case that the calibration parameters of the lidar are not given.

Figure 2:
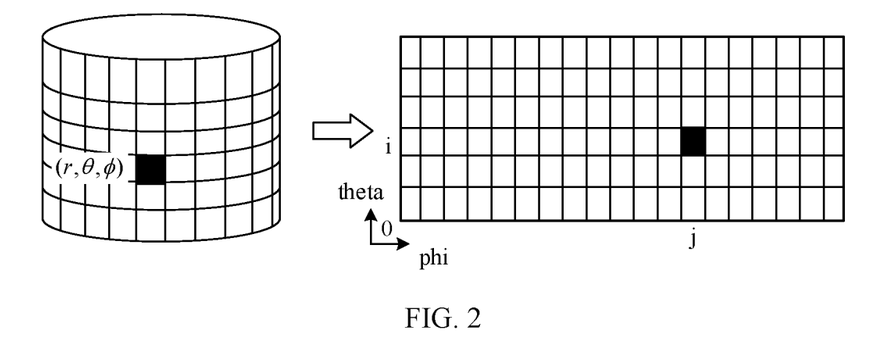
FIG. 2 is a schematic diagram of a correspondence between cylindrical coordinates of points and pixels in a two-dimensional projection plane according to an embodiment of the present invention.

The two-dimensional regularization projection plane structure of the point cloud is a data structure including M rows and N columns of pixels, and points in the three-dimensional point cloud correspond to the pixels in the data structure after projection. In addition, a pixel (i,j) in the data structure may be associated with a cylindrical coordinate component $(\theta,\phi)$. For example, the pixel (i,j) corresponding to a cylindrical coordinate $(r, \theta, \phi)$ may be found by using the following formula.

$$i = \min_{1,2...LaserNum} |\theta - \theta_0|;$$

$$j = (\phi + 180°)/\Delta\varphi.$$

Specifically, FIG. 2 is a schematic diagram of a correspondence between cylindrical coordinates of points and pixels in a two-dimensional projection plane according to an embodiment of the present invention.

It should be noted that the correspondence of pixels herein is not limited to cylindrical coordinates.

Further, the resolution of the two-dimensional regularization projection plane may be obtained by using the regularization parameters. For example, it is assumed that the resolution of the two-dimensional regularization projection plane is M×N, then the quantity of laser scanners in the regularization parameters may be used to initialize M, and the sampling angle resolution $\Delta\varphi$ of the horizontal azimuth angle (or the quantity of sampling points of the laser scanner) is used to initialize N. For example, the following formula may be used, and finally the initialization of the two-dimensional projection plane structure can be completed, to obtain a plane structure including M×N pixels.

$$M = laserNum;$$

$$N = \frac{360°}{\Delta\varphi} \text{ or } N = pointNumPerLaser.$$

In addition, a mapping relationship between the original point cloud data and the two-dimensional projection plane structure is determined, so as to project the original point cloud data onto the two-dimensional projection plane structure.

In this part, by determining the position of the original point cloud in the two-dimensional projection plane structure point by point, and the point cloud originally distributed disorderly in the Cartesian coordinate system is mapped onto the evenly distributed two-dimensional regularization projection plane structure. Specifically, for each point in the original point cloud, a corresponding pixel is determined in the two-dimensional projection plane structure. For example, a pixel with the shortest spatial distance from a projection position of the point in the two-dimensional plane may be selected as the corresponding pixel of the point.

If a cylindrical coordinate system is used for two-dimensional projection, the specific process of determining pixels corresponding to the original point cloud is as follows:

a. A cylindrical coordinate component r of a current point in the original point cloud data is determined, and specifically, the following formula is used for calculation:

$$r=\sqrt{x^2+y^2}.$$

b. A search region of the current point in the two-dimensional projection plane structure is determined. Specifically, the entire two-dimensional projection plane structure may be directly selected as the search region. Further, to reduce the amount of calculation, the pitch angle θ and azimuth angle φ of the cylindrical coordinate component of the current point may further be used to determine the search region of the corresponding pixel in the two-dimensional projection plane structure, to reduce the search region.

c. After the search region is determined, for each pixel (i,j) in the search region, the regularization parameters, that is, the calibration parameters $\theta_0$, $V_o$, $H_o$, and $\alpha$ of the $i^{th}$ laser scanner of the lidar, are used to calculate the position (xl, yl, zl) of the current pixel in the Cartesian coordinate system, where the specific calculation formula is as follows:

$$\theta_i = \theta_0$$

$$\phi_j = -180° + j \times \Delta\phi$$

$$xl = r \cdot \sin(\phi_j - \alpha) - H_o \cdot \cos(\phi_j - \alpha)$$

$$yl = r \cdot \cos(\phi_j - \alpha) + H_o \cdot \sin(\phi_j - \alpha)$$

$$zl = r \cdot \tan\theta_i + V_o$$

d. After the position (xl, yl, zl) of the current pixel in the Cartesian coordinate system is obtained, a spatial distance between the position and the current point (x, y, z) is calculated and used as an error Err, that is:

$$\text{Err} = \text{dist}\{(x,y,z),(xl,yl,zl)\}$$

If the error Err is less than a current minimum error minErr, the error Err is used to update the minimum error minErr, and i and j corresponding to the current pixel are used to update i and j of the pixel corresponding to the current point; and if the error Err is greater than the minimum error minErr, the foregoing update process will not be performed.

e. After all the pixels in the search region have been traversed, the corresponding pixel (i,j) of the current point in the two-dimensional projection plane structure can be determined.

Figure 3:
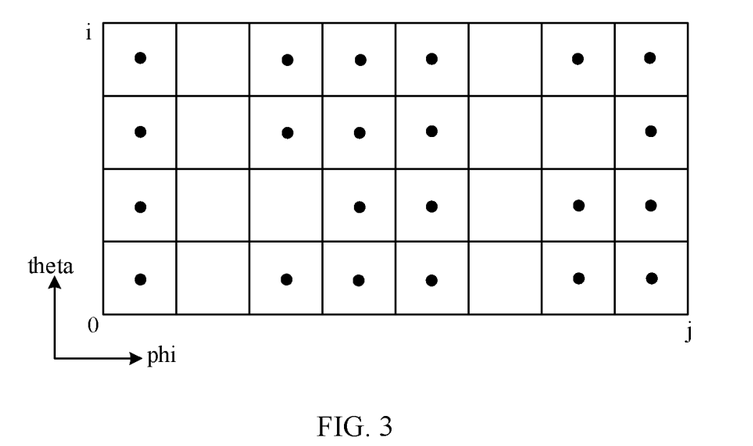
FIG. 3 is a schematic diagram of a two-dimensional projection plane structure of a point cloud according to an embodiment of the present invention.

When the foregoing operations have been completed for all the points in the original point cloud, the two-dimensional regularization plane projection of the point cloud is completed. Specifically, FIG. 3 is a schematic diagram of a two-dimensional projection plane structure of a point cloud according to an embodiment of the present invention. Each point in the original point cloud data is mapped to a corresponding pixel in the structure.

It should be noted that during the two-dimensional regularization plane projection of the point cloud, a plurality of points in the point cloud may correspond to the same pixel in the two-dimensional projection plane structure. To avoid this situation, these space points may be chosen to be projected to different pixels during projection. For example, during projection of a certain point, if the pixel corresponding to the point already has a corresponding point, the point is projected to an empty pixel adjacent to the pixel. In addition, if a plurality of points in the point cloud have been projected to the same pixel in the two-dimensional projection plane structure, during encoding based on the two-dimensional projection plane structure, the quantity of corresponding points in each pixel should be additionally encoded, and information of each corresponding point in the pixel is encoded according to the quantity of points.

S3: Obtain a Plurality of Pieces of Two-Dimensional Image Information According to the Two-Dimensional Projection Plane Structure.

In this embodiment, the plurality of pieces of two-dimensional image information may include a geometry information map. The geometry information map may be one or more of a placeholder information map, a depth information map, a projection residual information map, and a coordinate conversion error information map, or may be another geometry information map.

In this embodiment, specifically, a detailed description is made by using the four geometry information maps described above as an example.

a. Placeholder Information Map

The placeholder information map is used to identify whether each pixel in the two-dimensional regularization projection plane structure is occupied, that is, whether each pixel corresponds to a point in the point cloud. If each pixel is occupied, the pixel is referred to as being non-empty; otherwise, the pixel is referred to as being empty. For example, 0 and 1 may be used for representation, where 1 indicates that the current pixel is occupied; and 0 indicates that the current pixel is not occupied. In this way, the placeholder information map of the point cloud may be obtained according to the two-dimensional projection plane structure of the point cloud.

b. Depth Information Map

The depth information map is used to represent a distance between a corresponding point of each occupied pixel in the two-dimensional regularization projection plane structure and a coordinate origin. For example, the cylindrical coordinate component r of the point corresponding to the pixel may be used as a depth of the pixel. It is assumed that the Cartesian coordinate of the point corresponding to the pixel is (x, y, z), then the cylindrical coordinate component r of the point, that is, the depth of the pixel, may be obtained by using the formula $r = \sqrt{x^2 + y^2}$. Based on this, each occupied pixel in the two-dimensional regularization projection plane structure has a depth value, so that a corresponding depth information map is obtained.

c. Projection Residual Information Map

Figure 4:
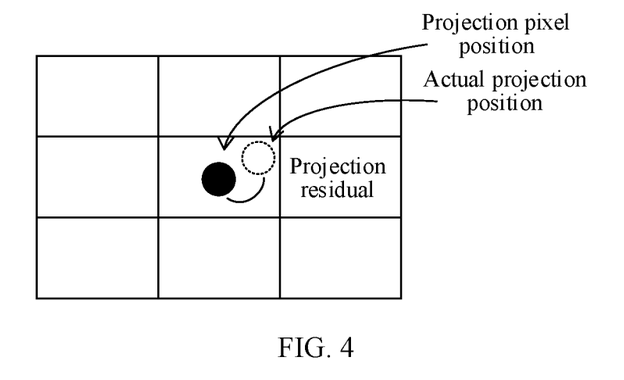
FIG. 4 is a schematic diagram of a projection residual according to an embodiment of the present invention.

The projection residual information map is used to represent a residual between a corresponding position and an actual projection position of each occupied pixel in the two-dimensional regularization projection plane structure. FIG. 4 is a schematic diagram of a projection residual according to an embodiment of the present invention.

Specifically, the projection residual of the pixel may be calculated in the following manner. It is assumed that the current pixel is (i,j), and a Cartesian coordinate of a corresponding point of the current pixel is (x, y, z), then the actual projection position of the point may be expressed as (φ',i'), which may be calculated by using the following formula:

$$\phi' = \arctan\left(\frac{y}{x}\right)$$

$$i' = \arg\min_{1,2\ldots LaserNum} |z - V_o - r \times \tan(\theta_0)|$$

The corresponding position of the current pixel may be expressed as ($\phi_j$,i), which may be calculated by using the following formula:

$$\phi_j = -180° + j \times \Delta\phi$$

Therefore, the projection residual ($\Delta\phi$,$\Delta i$) corresponding to the current pixel may be calculated by using the following formula:

$$\Delta\phi = \phi' - \phi_j$$

$\Delta i = i' - i$

Based on the foregoing calculation, each occupied pixel in the two-dimensional regularization projection plane has a projection residual, so that a projection residual information map corresponding to the point cloud is obtained.

d. Coordinate Conversion Error Information Map

The coordinate conversion error information map is used to represent a residual between a spatial position obtained through inverse projection of each occupied pixel in the two-dimensional regularization projection plane structure and a spatial position of an original point corresponding to the pixel.

For example, a coordinate conversion error of the pixel may be calculated in the following manner. It is assumed that the current pixel is (i,j), and the Cartesian coordinate of the corresponding point of the current pixel is (x, y, z), then the pixel may be inversely converted back to the Cartesian coordinate system by using regularization parameters and the following formula, to obtain the corresponding Cartesian coordinate (xl, yl, zl):

$$\theta_i = \theta_0$$

$$\phi_j = -180° + j \times \Delta\phi$$

$$r = \sqrt{x^2 + y^2}$$

$$xl = r \cdot \sin(\phi_j - \alpha) - H_o \cdot \cos(\phi_j - \alpha)$$

$$yl = r \cdot \cos(\phi_j - \alpha) + H_o \cdot \sin(\phi_j - \alpha)$$

$$zl = r \cdot \tan\theta_i + V_o$$

Subsequently, the coordinate conversion error ($\Delta x$, $\Delta y$, $\Delta z$) of the current pixel may be calculated by using the following formula:

$$\Delta x = x - xl$$

$$\Delta y = y - yl$$

$$\Delta z = z - zl$$

Based on the foregoing calculation, each occupied pixel in the two-dimensional regularization projection plane structure has a coordinate conversion error, so that a coordinate conversion error information map corresponding to the point cloud is obtained.

According to the present invention, a point cloud in a three-dimensional space is projected to a corresponding two-dimensional regularization projection plane structure, and regularization correction is performed on the point cloud in a vertical direction and a horizontal direction, to obtain a strong correlation representation of the point cloud on the two-dimensional projection plane structure, so that the spatial correlation of the point cloud is better reflected, thereby improving the encoding efficiency of the point cloud.

S4: Encode the Plurality of Pieces of Two-Dimensional Image Information to Obtain Code Stream Information.

Figure 5:
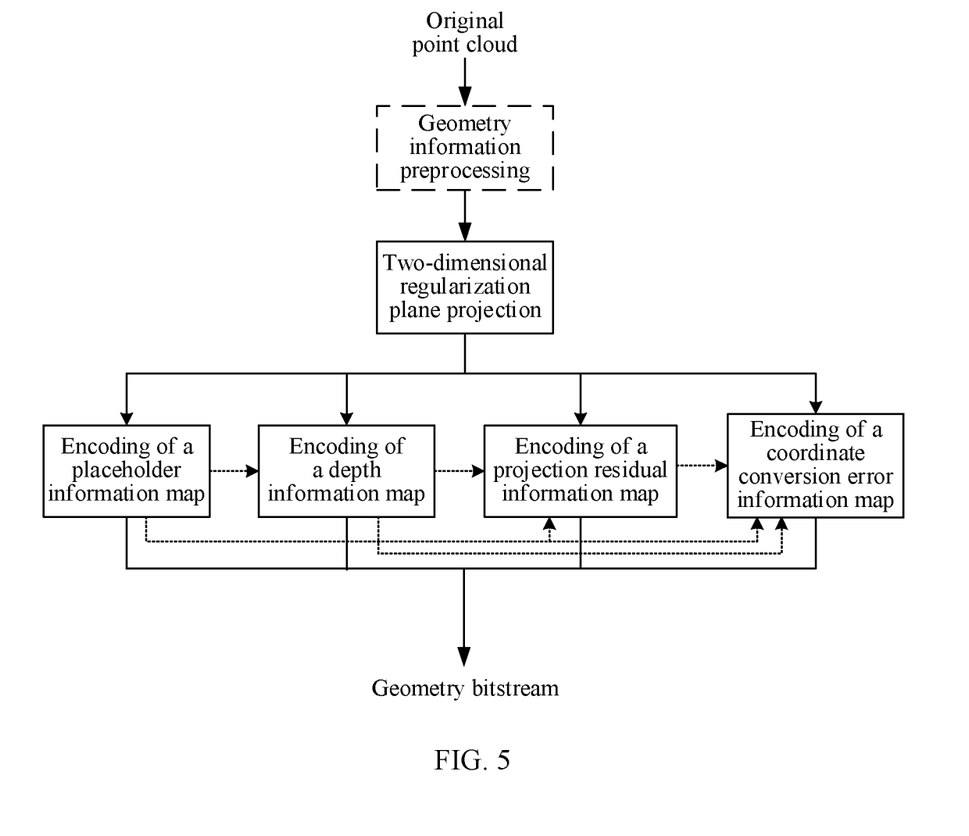
FIG. 5 is an encoding framework diagram of point cloud geometry information according to an embodiment of the present invention.

FIG. 5 is an encoding framework diagram of point cloud geometry information according to an embodiment of the present invention.

In this embodiment, the placeholder information map, the depth information map, the projection residual information map, and the coordinate conversion error information map obtained in step S3 are encoded, to obtain a placeholder information code stream, a depth information code stream, a projection residual information code stream, and a coordinate conversion error information code stream respectively.

Specifically, in this embodiment, pixels in the placeholder information map, the depth information map, the projection residual information map, and the coordinate conversion error information map are separately traversed in a certain scanning order, for example, through Z-shaped scanning.

For the current pixel in the placeholder information map, the reconstructed placeholder information of the encoded and decoded pixels may be used for prediction. Specifically, various existing neighbor prediction technologies may be used. After the corresponding predicted residual is obtained, the existing entropy encoding technology may be used for encoding, to obtain a placeholder information code stream.

For the current pixel in the depth information map, the reconstructed placeholder information map and the reconstructed depth information of the encoded and decoded pixels may be used for prediction. Specifically, the prediction may be performed based on the existing neighbor prediction technology in combination with the placeholder information of neighbor pixels, that is, only neighbor pixels with non-empty placeholder information are used to predict the depth information of the current pixel. The predicted value may be calculated in manners such as weighted averaging. After the corresponding predicted residual is obtained, the existing entropy encoding technology may be used for encoding, to obtain a depth information code stream.

For the current pixel in the projection residual information map, the reconstructed placeholder information map and depth information map and the reconstructed projection residual information of the encoded and decoded pixels may be used for prediction. Specifically, the prediction may be performed based on the existing neighbor prediction technology in combination with the placeholder information and the depth information of neighbor pixels, that is, only neighbor pixels with non-empty placeholder information and with depth information close to that of the current pixel are used to predict the projection residual information of the current pixel. The predicted value may be calculated in manners such as weighted averaging. After the corresponding predicted residual is obtained, the existing entropy encoding technology may be used for encoding, to obtain a projection residual information code stream.

For the current pixel in the coordinate conversion error information map, the reconstructed placeholder information map, depth information map, and projection residual information map, and the reconstructed coordinate conversion error information of the encoded and decoded pixels may be used for prediction. Specifically, the prediction may be performed based on the existing neighbor prediction technology in combination with the placeholder information, depth information, and projection residual information of neighbor pixels, that is, only neighbor pixels with non-empty placeholder information and with depth information and projection residual information close to those of the current pixel are used to predict the coordinate conversion error information of the current pixel. The predicted value may be calculated in manners such as weighted averaging. After the corresponding predicted residual is obtained, the existing entropy encoding technology may be used for encoding, to obtain a coordinate conversion error information code stream.

In addition, the predicted residual may alternatively be quantized and then encoded.

In this embodiment, when the plurality of pieces of two-dimensional map information obtained through two-dimensional regularization plane projection such as the placeholder information map, depth information map, projection residual information map, and coordinate conversion error information map are encoded, the strong correlation in the two-dimensional image may be effectively used to perform prediction and entropy encoding on the current pixel, so that the spatial correlation of the point cloud can be greatly utilized, and the spatial redundancy can be reduced, thereby further improving the encoding efficiency of the point cloud.

A geometry information code stream is obtained according to the placeholder information code stream, the depth information code stream, the projection residual information code stream, and the coordinate conversion error information code stream.

In this embodiment, after all the geometry information maps are encoded, a geometry information code stream of the original point cloud data can be obtained.

In another embodiment of the present invention, for the foregoing geometry information maps, compression may alternatively be performed through image/video compression and the like, which include, but not limited to: JPEG, JPEG2000, HEIF, H.264\AVC, H.265\HEVC, and the like.

In addition, it should be noted that the change and adjustment of the projection residual of the point cloud will affect the magnitude of the coordinate conversion error thereof. Therefore, to obtain higher encoding efficiency, the projection residual and coordinate conversion error of the point cloud may be adjusted, and are not fixed. For example, for lossless encoding, if the two-dimensional projection accuracy is relatively high, the projection residual is relatively small. Therefore, the projection residual may be set to 0. Although this operation slightly increases the coordinate conversion error, in a case that the encoding efficiency of the coordinate conversion error is allowed to have a certain decrease or remain unchanged, the encoding efficiency of the projection residual can be greatly improved. Alternatively, if the accuracy of the two-dimensional projection is relatively low, the projection residual is relatively large. In this case, the projection residual may be adjusted appropriately, so that the coordinate conversion error changes accordingly. Subsequently, the adjusted projection residual and coordinate conversion error are encoded, and higher encoding efficiency may also be obtained. For lossy encoding, if the two-dimensional projection accuracy is relatively high, the projection residual is relatively small, so that the projection residual may not be encoded. Alternatively, if the coordinate conversion error is relatively small, the coordinate conversion error may not be encoded, thereby improving the encoding efficiency. Alternatively, the projection residual and the coordinate conversion error may be appropriately adjusted, and then the adjusted projection residual and the adjusted coordinate conversion error are encoded, and higher encoding efficiency may also be obtained.

Embodiment 2

Figure 6:
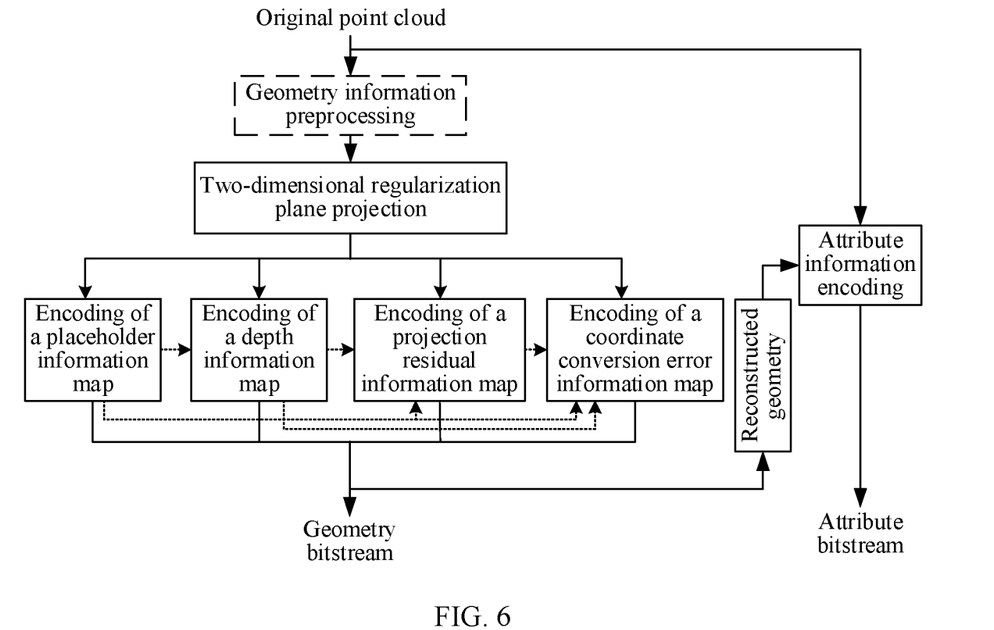
FIG. 6 is a framework diagram of performing attribute information encoding based on reconstructed geometry information according to an embodiment of the present invention.

Based on completing the geometry information encoding in the Embodiment 1, attribute information encoding may further be performed based on the reconstructed geometry information. FIG. 6 is a framework diagram of performing attribute information encoding based on reconstructed geometry information according to an embodiment of the present invention.

First, geometry reconstruction is performed according to the geometry information code stream obtained in Embodiment 1 to obtain reconstructed point cloud geometry information.

Subsequently, attribute information of the original point cloud data is encoded based on the reconstructed point cloud geometry information to obtain an attribute information code stream.

Specifically, attribute information encoding is generally performed on the color and reflectivity information of space points. The attribute information of the original point cloud data may be encoded by using the existing technology based on the geometric reconstructed information of the point cloud. For example, the color information in attributes is first converted from the RGB color space to the YUV color space. Subsequently, the point cloud is recolored based on the reconstructed geometry information, so that the attribute information that is not encoded corresponds to the reconstructed geometry information. After the point cloud is sorted by using the Morton code or Hilbert code, a reconstructed attribute value of an encoded point is used to perform interpolation prediction on a point to be predicted, to obtain a predicted attribute value, and then a difference is made between a real attribute value and the predicted attribute value to obtain a predicted residual. Finally, the predicted residual is quantized and encoded to generate a binary code stream.

Embodiment 3

Figure 7:
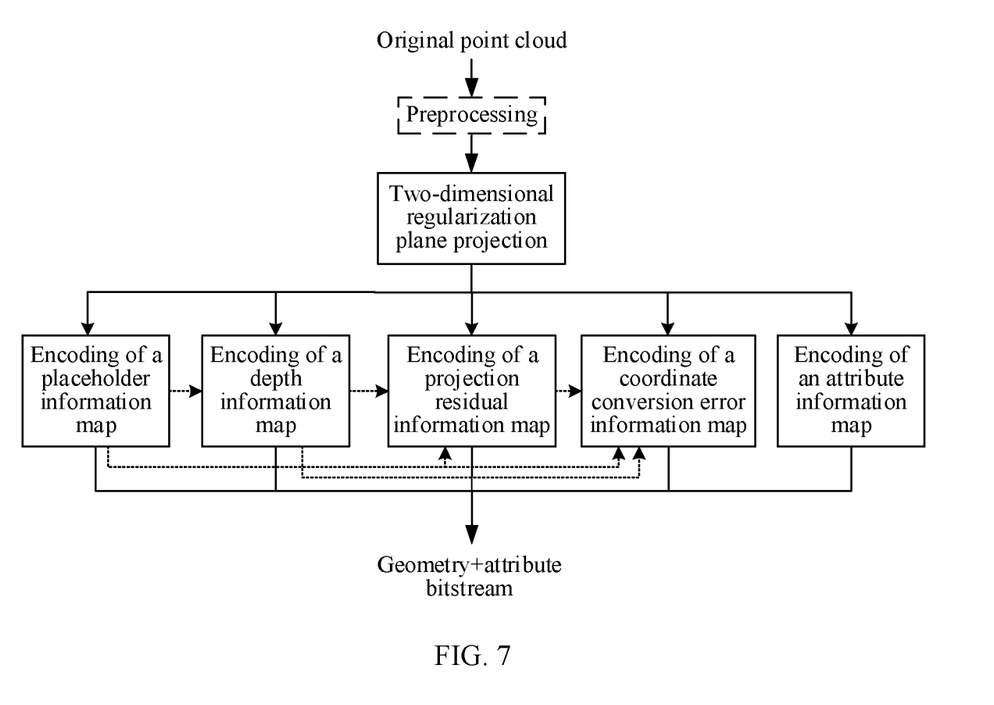
FIG. 7 is a framework diagram of simultaneously encoding point cloud geometry information and attribute information according to an embodiment of the present invention.

Based on Embodiment 1, an attribute information map can also be obtained simultaneously by using the two-dimensional projection plane structure. Subsequently, the geometry information map and the attribute information map are simultaneously encoded, to obtain a geometry information code stream and an attribute information code stream. FIG. 7 is a framework diagram of simultaneously encoding point cloud geometry information and attribute information according to an embodiment of the present invention.

Specifically, for the encoding process of the geometry information map, reference may be made to Embodiment 1. The encoding process of the attribute information map is as follows:

First, pixels in the attribute information map are traversed in a certain scanning order, for example, through Z-shaped scanning. Subsequently, for the current pixel in the attribute information map, the reconstructed placeholder information map and the reconstructed attribute information of the encoded and decoded pixels may be used for prediction. Specifically, the prediction may be performed based on the existing neighbor prediction technology in combination with the placeholder information of neighbor pixels, that is, only neighbor pixels with non-empty placeholder information are used to predict the attribute information of the current pixel. The predicted value may be calculated in manners such as weighted averaging. After the corresponding predicted residual is obtained, the existing entropy encoding technology may be used for encoding, to obtain an attribute information code stream.

In this embodiment, the geometry information map and the attribute information map are simultaneously obtained by using the two-dimensional projection plane structure, and then the geometry information and the attribute information are simultaneously encoded, thereby improving the encoding efficiency.

Embodiment 4

Figure 8:
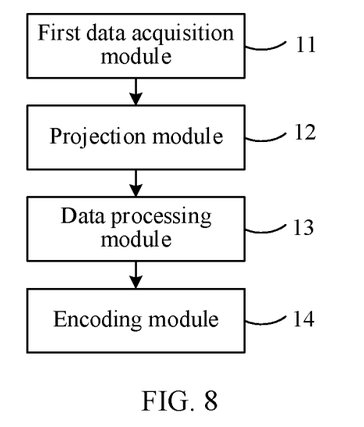
FIG. 8 is a schematic structural diagram of a point cloud encoding device based on a two-dimensional regularization plane projection according to an embodiment of the present invention.

Based on Embodiment 1 to Embodiment 3, this embodiment provides a point cloud encoding device based on a two-dimensional regularization plane projection. FIG. 8 is a schematic structural diagram of a point cloud encoding device based on a two-dimensional regularization plane projection according to an embodiment of the present invention, which includes:

- a first data acquisition module 11, configured to acquire original point cloud data;
- a projection module 12, configured to perform two-dimensional regularization plane projection on the original point cloud data to obtain a two-dimensional projection plane structure;
- a data processing module 13, configured to obtain a plurality of pieces of two-dimensional image information according to the two-dimensional projection plane structure; and
- an encoding module 14, configured to encode the plurality of pieces of two-dimensional image information to obtain code stream information.

The encoding device provided in this embodiment can implement the encoding method described in Embodiment 1 to Embodiment 3, and the detailed process is not described herein again.

Embodiment 5

Figure 9:
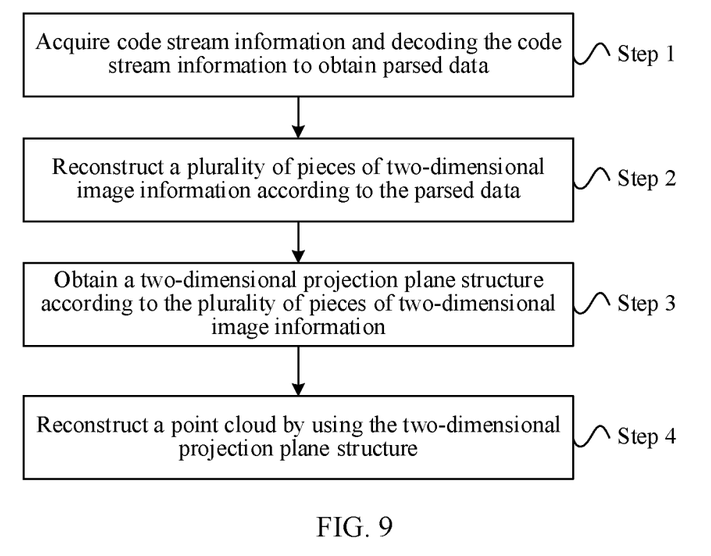
FIG. 9 is a schematic diagram of a point cloud decoding method based on a two-dimensional regularization plane projection according to an embodiment of the present invention.

FIG. 9 is a schematic diagram of a point cloud decoding method based on a two-dimensional regularization plane projection according to an embodiment of the present invention, the method includes:

Step 1: Acquire Code Stream Information and Decoding the Code Stream Information to Obtain Parsed Data.

A decoder side acquires compressed code stream information, and uses a corresponding existing entropy decoding technology to perform corresponding decoding on the code stream information to obtain the parsed data.

Step 2: Reconstruct a Plurality of Pieces of Two-Dimensional Image Information According to the Parsed Data.

In this embodiment, the plurality of pieces of two-dimensional image information include a geometry information map, the geometry information map including a placeholder information map, a depth information map, a projection residual information map, and a coordinate conversion error information map.

Based on this, the parsed data mainly includes the predicted residual of placeholder information, the predicted residual of depth information, the predicted residual of projection residual information, and the predicted residual of coordinate conversion error information.

Because the encoder side separately traverses the pixels in the placeholder information map, the depth information map, the projection residual information map, and the coordinate conversion error information map in a certain scanning order and encodes the corresponding information, predicted residual information of the pixels obtained by the decoder side is also in this order, and the decoder side may obtain the resolution of the two-dimensional maps by using regularization parameters. For details, reference may be made to the part of initializing the two-dimensional projection plane structure in S2 in Embodiment 1. Therefore, the decoder side can know a position of a pixel currently to be reconstructed in the two-dimensional map.

For the pixel currently to be reconstructed in the placeholder information map, the reconstructed placeholder information of the encoded and decoded pixels is used for prediction. The prediction method is consistent with that of the encoder side. Subsequently, the placeholder information of the current pixel is reconstructed according to the obtained predicted value and the parsed predicted residual.

For the pixel currently to be reconstructed in the depth information map, the reconstructed placeholder information map and reconstructed depth information of the encoded and decoded pixels may be used for prediction. The prediction method is consistent with that of the encoder side, that is, only neighbor pixels with non-empty placeholder information are used to predict the depth information of the current pixel, and then the depth information of the current pixel is reconstructed according to the obtained predicted value and the parsed predicted residual.

For the pixel currently to be reconstructed in the projection residual information map, the reconstructed placeholder information map, the reconstructed depth information map, and reconstructed projection residual information of the encoded and decoded pixels may be used for prediction. The prediction method is consistent with that of the encoder side, that is, only neighbor pixels with non-empty placeholder information and with depth information close to that of the current pixel are used to predict the projection residual information of the current pixel, and then the projection residual information of the current pixel is reconstructed according to the obtained predicted value and the parsed predicted residual.

For the pixel currently to be reconstructed in the coordinate conversion error information map, the reconstructed placeholder information map, the reconstructed depth information map, the reconstructed projection residual information map, and reconstructed coordinate conversion error information of the encoded and decoded pixels may be used for prediction. The prediction method is consistent with that of the encoder side, that is, only neighbor pixels with non-empty placeholder information and with depth information and projection residual information close to those of the current pixel are used to predict the coordinate conversion error information of the current pixel, and then the coordinate conversion error information of the current pixel is reconstructed according to the obtained predicted value and the parsed predicted residual.

After each pixel in the placeholder information map, the depth information map, the projection residual information map, and the coordinate conversion error information map is reconstructed, a reconstructed placeholder information map, a reconstructed depth information map, a reconstructed projection residual information map, and a reconstructed coordinate conversion error information map can be obtained.

In addition, the parsed data may further include the predicted residual of the attribute information, and correspondingly, the attribute information map may also be reconstructed based on the information.

Step 3: Obtain a Two-Dimensional Projection Plane Structure According to the Plurality of Pieces of Two-Dimensional Image Information.

Because the resolution of the two-dimensional projection plane structure is consistent with those of the placeholder information map, the depth information map, the projection residual information map, and the coordinate conversion error information map, and all the two-dimensional image information has been reconstructed, the placeholder information, the depth information, the projection residual information, and the coordinate conversion error information of each pixel in the two-dimensional projection plane structure can be known, so as to obtain a reconstructed two-dimensional projection plane structure.

Correspondingly, the reconstructed two-dimensional projection plane structure may further include attribute information of the point cloud.

Step 4: Reconstruct a Point Cloud by Using the Two-Dimensional Projection Plane Structure.

Specifically, by traversing the pixels in the reconstructed two-dimensional projection plane structure in a certain scanning order, the placeholder information, depth information, projection residual information, and coordinate conversion error information of each pixel can be known. If the placeholder information of the current pixel (i,j) is non-empty, the space point (x, y, z) corresponding to the pixel may be reconstructed according to the depth information of the current pixel, namely, the cylindrical coordinate component r of the corresponding point of the pixel, the projection residual information, namely, a residual ($\Delta\phi, \Delta i$) between the corresponding position of the pixel and the actual projection position, and the coordinate conversion error information, namely, a residual ($\Delta x, \Delta y, \Delta z$) between a spatial position obtained by inverse projection of the pixel and the spatial position of the original point corresponding to the pixel in the following manner.

The corresponding position of the current pixel (i,j) may be expressed as ($\phi_j$, i), then the actual projection position ($\phi'$, i') of the space point corresponding to the current pixel is:

$$\phi_j = -180° + j \times \Delta\phi$$

$$\phi' = \phi_j + \Delta\phi$$

$$i' = i + \Delta i$$

The current pixel may be inversely projected back to the Cartesian coordinate system by using regularization parameters and the following formula, to obtain a corresponding Cartesian coordinate (xl, yl, zl):

$$\theta_i = \theta_0$$

$$xl = r \cdot \sin(\phi_j - \alpha) - H_o \cdot \cos(\phi_j - \alpha)$$

$$yl = r \cdot \cos(\phi_j - \alpha) + H_o \cdot \sin(\phi_j - \alpha)$$

$$zl = r \cdot \tan\theta_i + V_o$$

The space point (x, y, z) corresponding to the current pixel is reconstructed according to the spatial position (xl, yl, zl) obtained by inverse projection of the current pixel and the coordinate conversion error ($\Delta x, \Delta y, \Delta z$) by using the following formula.

$$x = xl + \Delta x$$

$$y = yl + \Delta y$$

$$z = zl + \Delta z$$

A corresponding space point can be reconstructed for each non-empty pixel in the two-dimensional projection structure according to the foregoing calculation, to obtain the reconstructed point cloud.

It should be noted that when the point cloud is reconstructed at the decoder side, the reconstruction manner may be adaptively selected according to the encoding manner of the geometry information and attribute information of the point cloud at the encoder end, so as to obtain the corresponding reconstructed point cloud.

Embodiment 6

Figure 10:
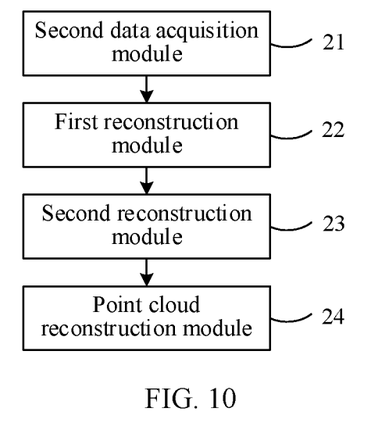
FIG. 10 is a schematic structural diagram of a point cloud decoding device based on a two-dimensional regularization plane projection according to an embodiment of the present invention.

Based on Embodiment 5, this embodiment provides a point cloud decoding device based on a two-dimensional regularization plane projection. FIG. 10 is a schematic structural diagram of a point cloud decoding device based on a two-dimensional regularization plane projection according to an embodiment of the present invention, which includes:

a second data acquisition module 21, configured to acquire code stream information and decode the code stream information to obtain parsed data;

a first reconstruction module 22, configured to reconstruct a plurality of pieces of two-dimensional image information according to the parsed data;

a second reconstruction module 23, configured to obtain a two-dimensional projection plane structure according to the plurality of pieces of two-dimensional image information; and a point cloud reconstruction module 24, configured to reconstruct a point cloud by using the two-dimensional projection plane structure.

The decoding device provided in this embodiment can implement the decoding method in Embodiment 5, and the detailed process is not described herein again.

The foregoing contents are detailed descriptions of the present invention with reference to specific exemplary embodiments, and it should not be considered that the specific implementation of the present invention is limited to these descriptions. A person of ordinary skill in the art, to which the present invention belongs, may further make several simple deductions or replacements without departing from the concept of the present invention, and such deductions or replacements should all be considered as falling within the protection scope of the present invention.

What is claimed is:

1. A method, comprising:
   acquiring original point cloud data;
   performing two-dimensional regularization plane projection on the original point cloud data to obtain a two-dimensional projection plane structure;
   obtaining a plurality of pieces of two-dimensional image information according to the two-dimensional projection plane structure,
   wherein the plurality of pieces of two-dimensional image information comprises a geometry information map, the geometry information map comprising a placeholder information map, a depth information map, a projection residual information map, and a coordinate conversion error information map; and
   encoding the plurality of pieces of two-dimensional image information to obtain code stream information.

2. The method according to claim 1, wherein the performing the two-dimensional regularization plane projection on the original point cloud data to obtain the two-dimensional projection plane structure comprises:
   initializing the two-dimensional projection plane structure; and
   determining a mapping relationship between the original point cloud data and the two-dimensional projection plane structure, to project the original point cloud data onto the two-dimensional projection plane structure.

3. The method according to claim 1, wherein the encoding the plurality of pieces of two-dimensional image information to obtain the code stream information comprises:
   encoding the placeholder information map, the depth information map, the projection residual information map, and the coordinate conversion error information map, to obtain a placeholder information code stream, a depth information code stream, a projection residual information code stream, and a coordinate conversion error information code stream, respectively; and obtaining a geometry information code stream according to the placeholder information code stream, the depth information code stream, the projection residual information code stream, and the coordinate conversion error information code stream.

4. The method according to claim 3, wherein the method further comprises:
after the obtaining the geometry information code stream:
performing geometry reconstruction according to the geometry information code stream to obtain reconstructed point cloud geometry information; and
encoding attribute information of the original point cloud data based on the reconstructed point cloud geometry information to obtain an attribute information code stream.

5. The method according to claim 1, wherein the plurality of pieces of two-dimensional image information further comprises an attribute information map.

6. The method according to claim 5, wherein the encoding the plurality of pieces of two-dimensional image information to obtain the code stream information further comprises:
encoding the attribute information map to obtain an attribute information code stream.

7. A device, comprising:
at least one processor; and
a non-transitory computer readable storage medium storing programming, the programming including instructions that, when executed by the at least one processor, cause the device to perform operations including:
acquiring original point cloud data;
performing two-dimensional regularization plane projection on the original point cloud data to obtain a two-dimensional projection plane structure;
obtaining a plurality of pieces of two-dimensional image information according to the two-dimensional projection plane structure,
wherein the plurality of pieces of two-dimensional image information comprises a geometry information map, the geometry information map comprising a placeholder information map, a depth information map, a projection residual information map, and a coordinate conversion error information map; and
encoding the plurality of pieces of two-dimensional image information to obtain code stream information.

8. The device according to claim 7, wherein the performing the two-dimensional regularization plane projection on the original point cloud data to obtain the two-dimensional projection plane structure comprises:
initializing the two-dimensional projection plane structure; and
determining a mapping relationship between the original point cloud data and the two-dimensional projection plane structure, to project the original point cloud data onto the two-dimensional projection plane structure.

9. The device according to claim 7, wherein the encoding the plurality of pieces of two-dimensional image information to obtain the code stream information comprises:
encoding the placeholder information map, the depth information map, the projection residual information map, and the coordinate conversion error information map, to obtain a placeholder information code stream, a depth information code stream, a projection residual information code stream, and a coordinate conversion error information code stream, respectively; and
obtaining a geometry information code stream according to the placeholder information code stream, the depth information code stream, the projection residual information code stream, and the coordinate conversion error information code stream.

10. The device according to claim 9, the operations further comprising:
after the obtaining the geometry information code stream:
performing geometry reconstruction according to the geometry information code stream to obtain reconstructed point cloud geometry information; and
encoding attribute information of the original point cloud data based on the reconstructed point cloud geometry information to obtain an attribute information code stream.

11. The device according to claim 7, wherein the plurality of pieces of two-dimensional image information further comprises an attribute information map.

12. The device according to claim 11, wherein the encoding the plurality of pieces of two-dimensional image information to obtain the code stream information further comprises:
encoding the attribute information map to obtain an attribute information code stream.

13. A method, comprising:
acquiring code stream information;
decoding the code stream information to obtain parsed data;
reconstructing a plurality of pieces of two-dimensional image information according to the parsed data,
wherein the plurality of pieces of two-dimensional image information comprises a geometry information map, the geometry information map comprising a placeholder information map, a depth information map, a projection residual information map, and a coordinate conversion error information map;
obtaining a two-dimensional projection plane structure according to the plurality of pieces of two-dimensional image information; and
reconstructing a point cloud by using the two-dimensional projection plane structure.

14. The method of claim 13, the decoding comprising:
applying entropy decoding on the code stream information to obtain the parsed data.

15. The method of claim 13, the parsed data including predicted placeholder residual information, predicted depth residual information, predicted projection residual information, and predicted residual of coordinate conversion error residual information based on the placeholder information map, the depth information map, the projection residual information map, and the coordinate conversion error information map, respectively.

* * * * *